United States Patent [19]

Mifsud

[11] 4,211,301
[45] Jul. 8, 1980

[54] MARINE SEISMIC TRANSDUCER

[75] Inventor: Joseph F. Mifsud, Houston, Tex.

[73] Assignee: Exxon Production Research Company, Houston, Tex.

[21] Appl. No.: 11,341

[22] Filed: Feb. 12, 1979

[51] Int. Cl.$^2$ .............................................. G01V 1/38
[52] U.S. Cl. .................................. 181/120; 367/143; 92/39
[58] Field of Search ............... 181/110, 111, 120; 367/143; 73/669; 92/37, 39

[56] References Cited

U.S. PATENT DOCUMENTS

| | | | |
|---|---|---|---|
| 764,572 | 7/1904 | Fulton | 92/39 |
| 3,384,868 | 5/1968 | Brown et al. | 367/143 |
| 3,394,775 | 7/1968 | Cole et al. | 367/143 |
| 3,401,607 | 9/1968 | Wortman | 92/39 |
| 4,103,280 | 7/1978 | Chalet et al. | 367/143 |

FOREIGN PATENT DOCUMENTS

| | | | |
|---|---|---|---|
| 1810010 | 7/1969 | France | 367/43 |
| 399635 | 10/1973 | U.S.S.R. | 92/37 |

Primary Examiner—Nelson Moskowitz
Attorney, Agent, or Firm—James S. Hsue

[57] ABSTRACT

A method and apparatus for seismic prospecting which utilizes two transducer plates that are spaced apart, with two sets of bellows placed in between and sealingly attached thereto, to transmit electrically controlled hydraulic pressure signals onto the two plates. When pressure is applied within one set of bellows, the two plates are pushed apart. When pressure is applied within the second set of bellows, the two plates are pulled together. To accomplish this pulling action of the second set of bellows, two closure plates placed between the two transducer plates are used, one attached to one transducer plate and one attached to the other transducer plate. The first closure plate is attached to the first transducer plate in such a manner that it lies between the second transducer plate and the second closure plate. By applying pressure to the second set of bellows that push apart these two closure plates, the two transducer plates are pulled towards each other. By alternately applying hydraulic pressure within the two sets of bellows, reciprocation of the two transducer plates with respect to each other is achieved.

12 Claims, 5 Drawing Figures

MARINE SEISMIC TRANSDUCER

BACKGROUND OF THE INVENTION

1. Field of the Invention

This invention relates generally to marine seismic energy sources. In particular it relates to an improved marine seismic source that hydraulically reciprocates transducer plates to create acoustic signals in water.

2. Description of the Prior Art

The prior art includes several types of seismic mechanical vibrators which provide acoustic energy output in a body of water. These vibrators typically involve the use of pistons to transform electrically controlled hydraulic pressure signals to acoustic signals.

An example of such a vibrator can be found in U.S. Pat. No. 3,394,775, issued on July 30, 1968 to Cole et al. The disclosed system utilizes a hollow cylinder containing a piston that divides the cylindrical aperture of the cylinder into two chambers. Hydraulic pressure is applied alternately to the two chambers, and the pressure applied alternately on the two sides of the piston causes the piston to reciprocate slidingly along the inner surface of the cylinder. A plate is rigidly connected to the piston. As the piston reciprocates, the plate also reciprocates. When the plate is placed in a body of water, the reciprocation of the plate will impart seismic energy vibrations to the body of water. In order for the applied hydraulic pressure to be effective in driving the piston, the circumference of the piston must maintain sealing contact with the inner surface of the cylinder when the piston is sliding back and forth along the inner cylinder surface.

Other examples of vibrators using similar piston assemblies are described in U.S. Pat. No. 3,246,289 (1966) to Mellen; U.S. Pat. No. 3,403,374 (1968) to Mellen et al; U.S. Pat. No. 3,384,868 (1968) and U.S. Pat. No. 3,482,646 (1969), both issued to Brown et al. The parts in close contact may wear out and the vibrator may require regular replacement of parts.

SUMMARY OF THE INVENTION

The present invention contemplates transformation of hydraulic pressure signals into acoustic signals without using a piston. Hydraulic pressure is directly applied to two transducer plates through two sets of bellows. A first set of bellows, comprising one or more bellows, is connected between the transducer plates such that expansion of the bellows pushes the two transducer plates apart. A second set of bellows, comprising one or more bellows, is connected to the transducer plates such that expansion of the second set of bellows pulls the transducer plates towards each other. When hydraulic pressure is applied alternately to the two sets of bellows, the first and second sets of bellows will expand alternately, causing the transducer plates to reciprocate, thereby generating an acoustic signal.

In the preferred embodiments, the pulling action of the second set of bellows upon the transducer plates is achieved by using two reaction members located between the transducer plates. The first reaction member is attached to the first transducer plate, and the second member to the second transducer plate. The first reaction member lies between the second reaction member and the second transducer plate. When the two reaction members are forced apart, these members will pull the two transducer plates towards each other. Thus when the second set of bellows expand, they will push apart the two reaction members, thereby pulling the two transducer plates towards each other.

In the first embodiment of this invention, the two reaction members are two closure plates each attached to one of the transducer plates by means of rods. Each of the closure plates lies in the space between the other closure plate and the transducer plate that is attached to the other closure plate.

The second embodiment is similar to the first embodiment; it differs only in that a conduit plate is added to allow convenient routing of conduits through which hydraulic pressure may be applied.

A principal advantage of this invention is that it eliminates the use of moving parts in close contact which may require more frequent maintenance shut downs and replacement of parts.

In addition, construction of the apparatus is simplified because fewer parts require close fitting. Hence a further advantage is that less machine work and less preparation time may be required.

BRIEF DESCRIPTION OF THE DRAWINGS

Like reference numerals in different drawings designate like parts.

DESCRIPTION OF THE PREFERRED EMBODIMENTS

In prospecting in earth formations beneath bodies of water, a seismic source embodying the present invention may be used to introduce pressure waves into the water. The source is suspended into the water at the desired depth from a support vessel carrying the necessary auxiliary equipment. The seismic source generates pressure waves that propagate through the water, enter the underlying formations, are reflected in part by discontinuities in the formations, and subsequently propagate back through the water and are detected by hydrophones at or near the water's surface. The characteristics of the reflected waves are compared with the characteristics of the transmitted waves. This comparison reveals valuable information about the structure of the underlying formations and the probability of the presence of hydrocarbon accumulations.

Figure 1:
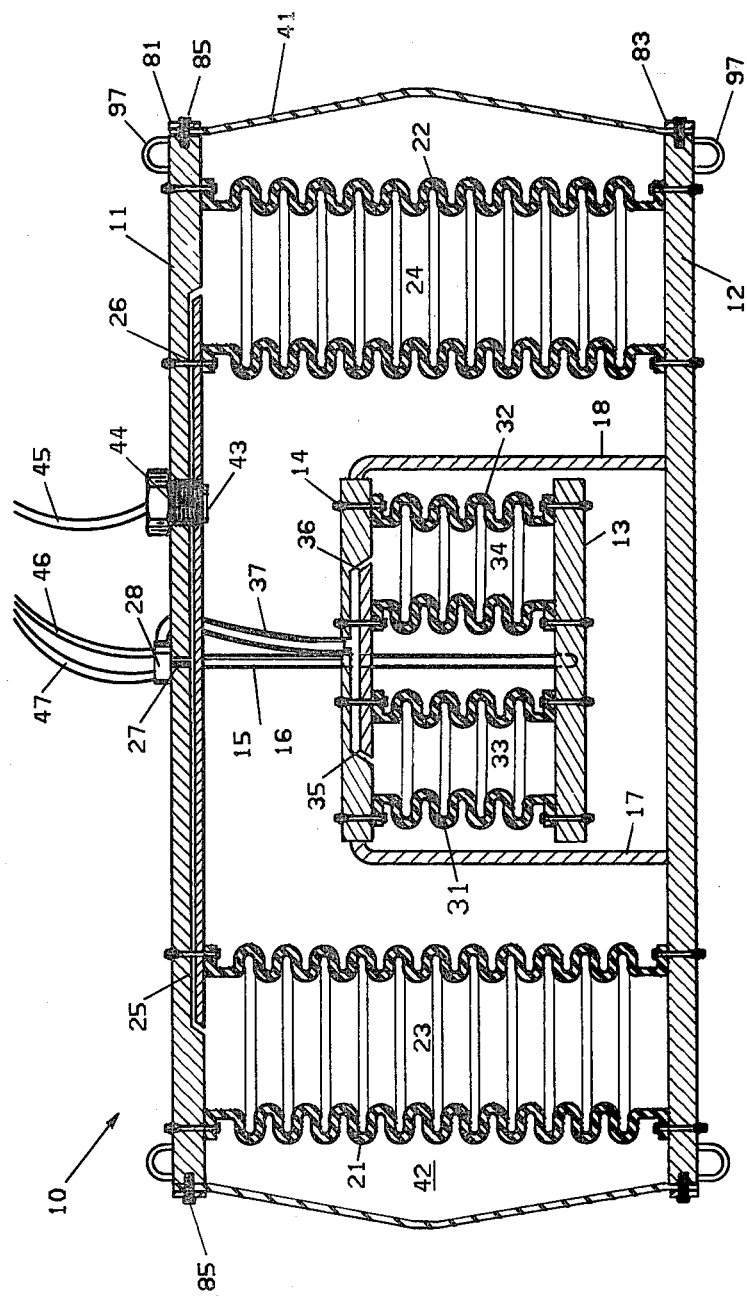
FIG. 1 is a view in horizontal cross-section of a seismic source embodying the first preferred configuration of the invention.

FIG. 1 shows a cross-section of a marine seismic source 10 embodying the first preferred configuration of the invention. Basically the source 10 comprises a first transducer plate 11, and a second transducer plate 12, the two plates being spaced apart from each other. When source 10 is submerged in water and transducer plates 11, 12 are reciprocated at a suitable frequency and amplitude, the plates will generate pressure waves useful for seismic prospecting. To reciprocate transducer plates 11, 12, two sets of bellows are used. Expansion of the first set pushes plates 11 and 12 apart and expansion of the second set pulls them together. While transducer plates 11, 12 in FIG. 1 are shown substantially parallel to each other, it will be appreciated that as long as the plates are spaced apart and allow attachment of bellows that accomplish the functions of the source to be described below, other orientations of one plate with respect to the other may be used and would come within the scope of this invention.

A first set of cylindrical bellows 21, 22, defining chambers 23, 24, respectively, is sealingly connected to the inner surfaces of first plate 11 and second plate 12. Conduits 25, 26 in plate 11 connect sealed chambers 23, 24, respectively to a port 27, leading to a servovalve 28 attached to plate 11. When hydraulic pressure is applied within chambers 23, 24, bellows 21, 22 will tend to expand, thereby tending to push plates 11, 12 apart.

A second set of cylindrical bellows 31, 32, defining chambers 33, 34, respectively is connected to a hydraulic line 37 through conduits 35, 36 leading to the hydraulic power supply through the servovalve 28. When hydraulic pressure is applied within chambers 33, 34, bellows 31, 32 will tend to expand. Each of the bellows 21, 22, 31, 32 may be in the general shape of a cylinder with convoluted surfaces.

The servovalve 28 may be a well known type of four-way valve which rapidly reverses the application of fluid pressure between port 27 and hydraulic line 37, thereby alternating the application of fluid pressure to the first and second sets of bellows. The servovalve 28 is connected to a hydraulic power supply 51 through a hydraulic cable 46. (FIG. 3) The operation of the servovalve may be controlled electrically in a manner well known in the art. Such control from support vessel 500 may be exercised through a cable 47 connecting the servovalve 28 to an electrical control system 53. The hydraulic power supply 51 and the electrical control system 53 may be placed as auxiliary equipment on support vessel 500 from which source 10 is suspended and operated.

While each set of bellows is shown in FIG. 1 to comprise two cylindrical bellows of similar dimensions, varying numbers of bellows may be used whether they be of similar or different dimensions, and whether they be cylindrical or not so long as the alternate expansion of the two sets of bellows will result in balanced movements of transducer plates 11, 12. For example, the first set of bellows may consist of a single annular bellows allowing space for bellows 31, 32. The second set of bellows may consist of a single oblong or rectangular bellows. It will be understood that all such variations in configuration of the bellows come within the scope of this invention.

Figure 2:
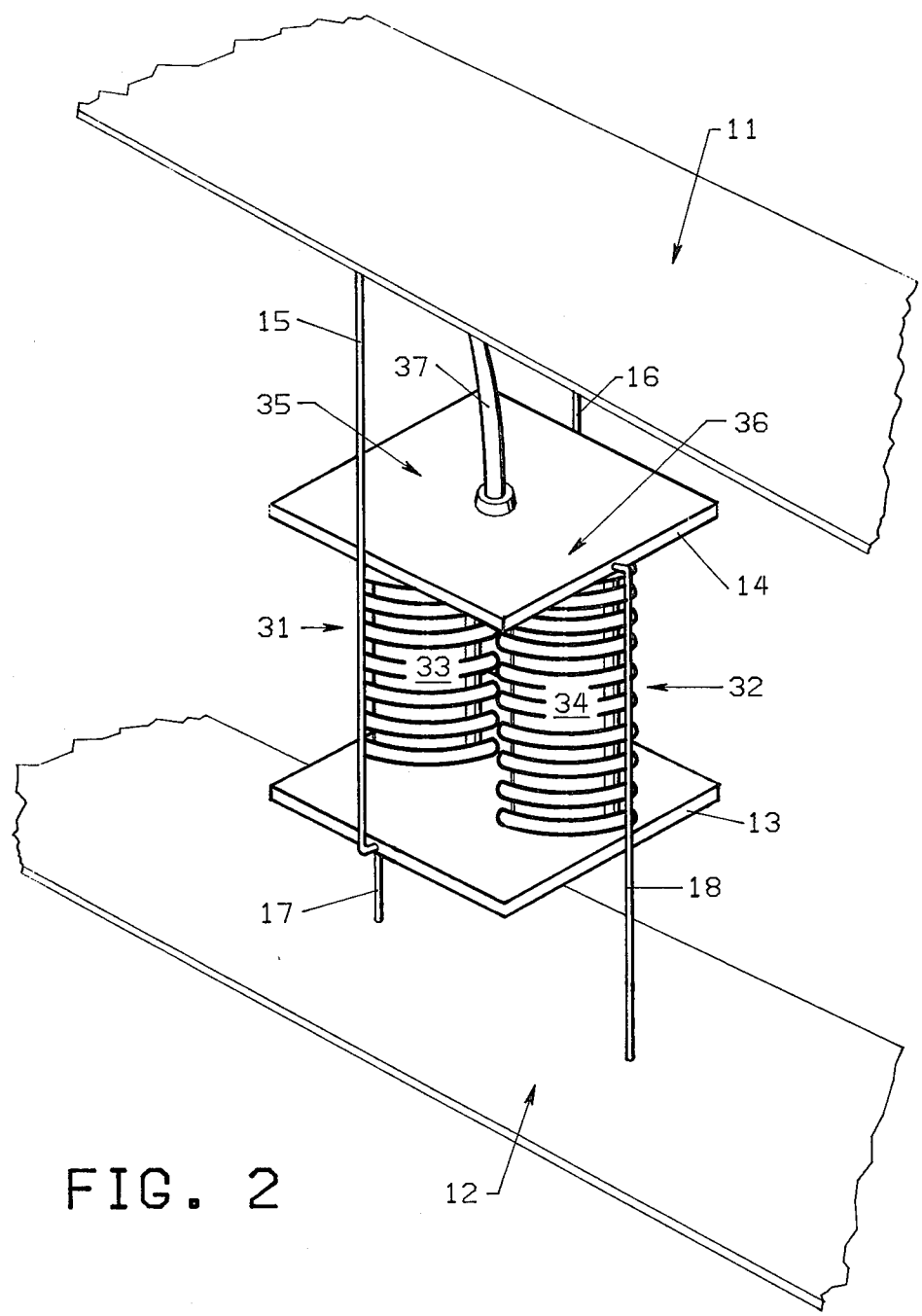
FIG. 2 is a perspective view showing the details of the reaction members of FIG. 1.

As described above, expansion of the first set of bellows pushes apart transducer plates 11, 12. In order for plates 11, 12 to reciprocate, these plates must also be pulled together. The pulling action of the second set of bellows 31, 32 upon transducer plates 11, 12 is accomplished by using two reaction members attached to plates 11, 12. The configuration and spatial relationships of the reaction members are such that when they are pushed apart, plates 11, 12 will move closer to each other. In the first preferred embodiment, the two reaction members comprise two closure plates 13, 14 disposed between plates 11, 12. The details of the action of plates 13, 14 are shown in FIGS. 1 and 2. Bellows 31, 32 are disposed between and sealingly connected to closure plates 13, 14. Closure plate 13 is attached to transducer plate 11 by means of two rods 15, 16. Closure plate 14 is attached to transducer plate 12 by means of rods 17, 18. The lengths of rods 15, 16, 17, 18 are such that plate 14 is between plate 11 and closure plate 13. When closure plates 13, 14 are pushed apart, these will in turn pull transducer plates 11, 12 towards each other. The expansion of the second set of bellows will push apart closure plates 13, 14, and will, therefore, pull transducer plates 11, 12 towards each other. If hydraulic pressure through servovalve 28 is applied alternately to the first and second sets of bellows, these sets will expand alternately, thereby reciprocating transducer plates 11 and 12. While the two closure plates are shown substantially parallel to each other, and each is shown connected to the transducer plates by rods, it should be understood that other suitable plate orientations as well as methods of securing the closure plates to the respective vibrator plates 11, 12 that accomplish the pulling function described above may be used and would come within the scope of this invention.

In the first preferred embodiment, the second set of bellows 31, 32 and closure plate 13 are located in the space between transducer plates 11, 12. Alternatively, the second set of bellows could be located exterior to the space between the transducer plates. For example, closure plate 13 may be placed on the opposite side of plate 12 from plate 11. Rods 15, 16 will pass through plate 12 in sealing engagement therewith to secure closure plate 13 to plate 11. Bellows 31, 32 are then connected between closure plate 13 and plate 12, and closure plate 14 may be eliminated. Thus expansion of bellows 31, 32 will pull plates 11, 12 towards each other.

Figure 5:
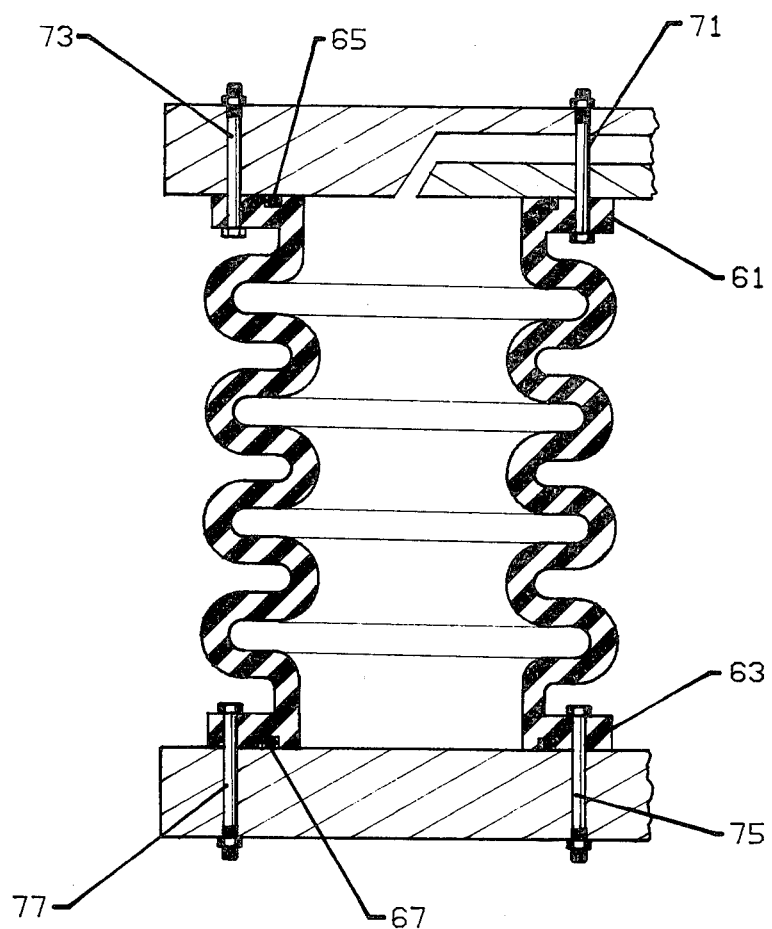
FIG. 5 is a view in horizontal cross-section of a bellows used in the invention.

In order that the hydraulic pressure applied to the bellows be effective in moving the plates, the connection of the bellows to the plates must be fluid tight. FIG. 5 shows the details of construction of each of the bellows used in the source. Each of the bellows 21, 22, 31, and 32 may be mounted onto the respective plate surfaces as follows. Each bellows has a pair of mounting rings 61, 63 welded or otherwise affixed to each end of the bellows. A fluid tight seal between the chamber enclosed by the bellows and the space outside may be provided by the groove/O-ring combinations 65, 67. The mounting rings 61, 63 are fastened onto the plate surfaces by cap screws 71, 73, 75, 77. The bellows and mounting rings may be constructed using stainless steel. Such bellows are commercially available from various sources, e.g., SEALOL, Inc. of Providence, R.I.

A rubber cylinder 41 is tightly clamped in air-tight relationship about the rim of each of plates 11 and 12 by means of rings 81, 83 and screws 85. (FIG. 1) The rubber cylinder 41, first plate 11 and second plate 12, define a chamber of air 42. Since source 10 is operated typically at shallow depths, e.g., thirty feet, the hydrostatic pressure that compresses source 10 is not great enough to seriously affect the functioning of the source. The air trapped within chamber 42 will be compressed slightly by the hydrostatic pressure, and the compressed air will, in turn, exert pressure on plates 11, 12 to equalize the hydrostatic pressure. However, if it is desired to control the air pressure within chamber 42, an air passage 43 may be placed through the first plate 11 and a suitable screw connector 44, and flexible air hose 45 utilized to connect air passage 43 to an air control apparatus 55. (FIG. 3) Thus the static air pressure in chamber 42 may be adjusted to equalize the pressure of the surrounding water. This will prevent the pressure from surrounding water from significantly affecting the operation of the source. The air control apparatus 55 may be placed as auxiliary equipment on support vessel 500 from which source 10 is suspended and operated. An alternative means that may be used to counter the hydrostatic pressure of the surrounding water is steel springs connected between transducer plates 11, 12. Clearly, other suitable and flexible materials other than rubber may be used to construct cylinder 41.

Figure 3:
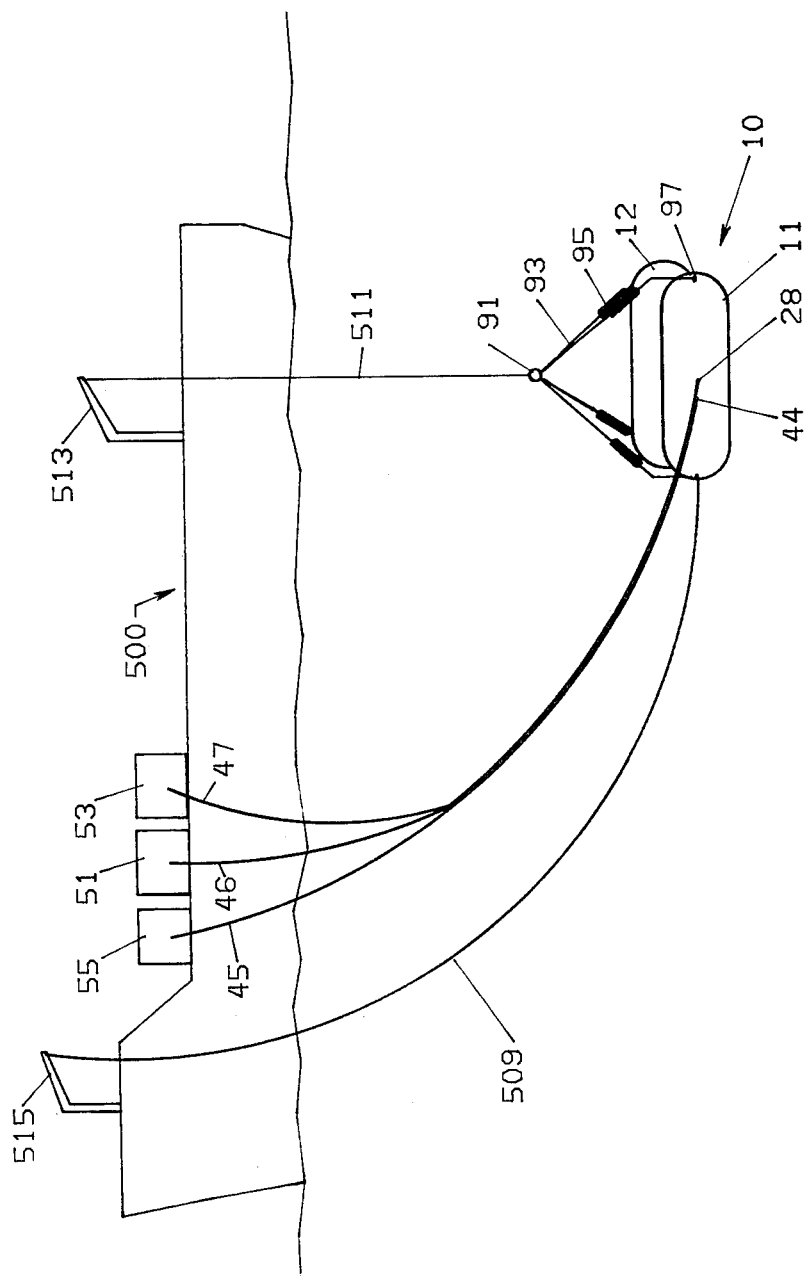
FIG. 3 is a schematic view showing a seismic source embodying the invention and suspended from a support vessel floating on the surface of the water.

FIG. 3 shows a schematic view of the preferred embodiment of the invention in operation. Source 10 is operated from a support vessel 500 carrying the necessary auxiliary equipment such as hydraulic system 51, air regulator 55 and electrical control system 53. The source 10 is suspended to the proper depth by a lift cable 511 from vessel 500 by means of an arm 513.

The pressure waves generated by source 10 are usually quite powerful and it may be necessary to take certain precautions in insulating the support vessel 500 from source 10. To keep source 10 a safe distance from vessel 500, the arm 513 may extend twenty to thirty feet over water from one side of the vessel. Thus source 10 operates about twenty to thirty feet off one side of vessel 500. the lift cable may be connected to source 10 via connector ring 91, a plurality of linkages 93 and shock absorbing springs 95 to a plurality of eye posts 97 which are welded onto transducer plates 11, 12. Eye posts 97 may be welded to the outer surfaces of plates 11, 12 near the midpoints of the curved parts of edges of the oblong shaped plates 11, 12. A plurality of springs 95 insulate the support vessel from vibrations of plates 11, 12. The source 10 is towed by a line 509 from another arm 515 that also extends over water about the same distance as arm 513 and from the same side of the vessel. The manner of suspension and insulation described above is merely illustrative, and other equivalent means of suspension and insulation could be used within the spirit of this invention.

The transducer plates 11, 12 are preferably oblong shaped to allow streamlined and easy towing. In FIG. 3 the plates are shown with surfaces facing sideways. Other plate orientations with respect to the water and the underlying earth surface may be used since the acoustic waves from the marine vibrator propagates in water in a spherical fashion and is not dependent upon the orientation of the plates in water.

It is suggested that using the following parameters may generate useful seismic signals. The transducer plates may be two to four feet long and one to two feet wide. The pressure wave generated may have frequencies in the 10 Hz to 100 Hz range in the form of swept sine waves. A single sweep of the pressure wave may last a few seconds. The amplitudes of the signals may be in the one-tenth (1/10) to one inch range. Clearly, such parameters may be changed without departing from the spirit of the invention. While swept sine waves are frequently used, source 10 may be used to generate pulse type signals as well as other continuous wave type signals. In operation, one or more seismic sources such as source 10 may be used.

In reference to FIG. 1, hydraulic pressure supplied through hydraulic cable 46 is applied to and withdrawn alternately from conduits 25, 26 and 35, 36 respectively. This is accomplished by electrically controlling the servovalve 28. Hydraulic pressure is therefore alternately applied to and withdrawn from bellows 21, 22, and 31, 32 respectively. When pressure is applied to bellows 21, 22 the pressure within chambers 23, 24 increases so that it is higher than pressure of the body of water surrounding the vibrator. Transducer plates 11, 12 are therefore pushed apart. As this happens, bellows 31, 32 contract and the pressure that is built up in chambers 33, 34 is released through servovalve 28. Then pressure is applied within bellows 31, 32, thereby pushing apart closure plates 13, 14. As closure plates 13, 14 are pushed part, they pull transducer plates 11 and 12 towards each other. This compresses bellows 21, 22 and pressure is released therefrom. Thus the transducer plates 11, 12 reciprocate with respect to each other in response to hydraulic pressure applied through servovalve 28. The acoustic wave generated propagates through water in a spherical form. Part of it propagates downwards and is reflected by the earth formations beneath the water. This reflection may be measured and correlated with the transmitted wave for seismic prospecting in a conventional manner.

ALTERNATIVE EMBODIMENT

Figure 4:
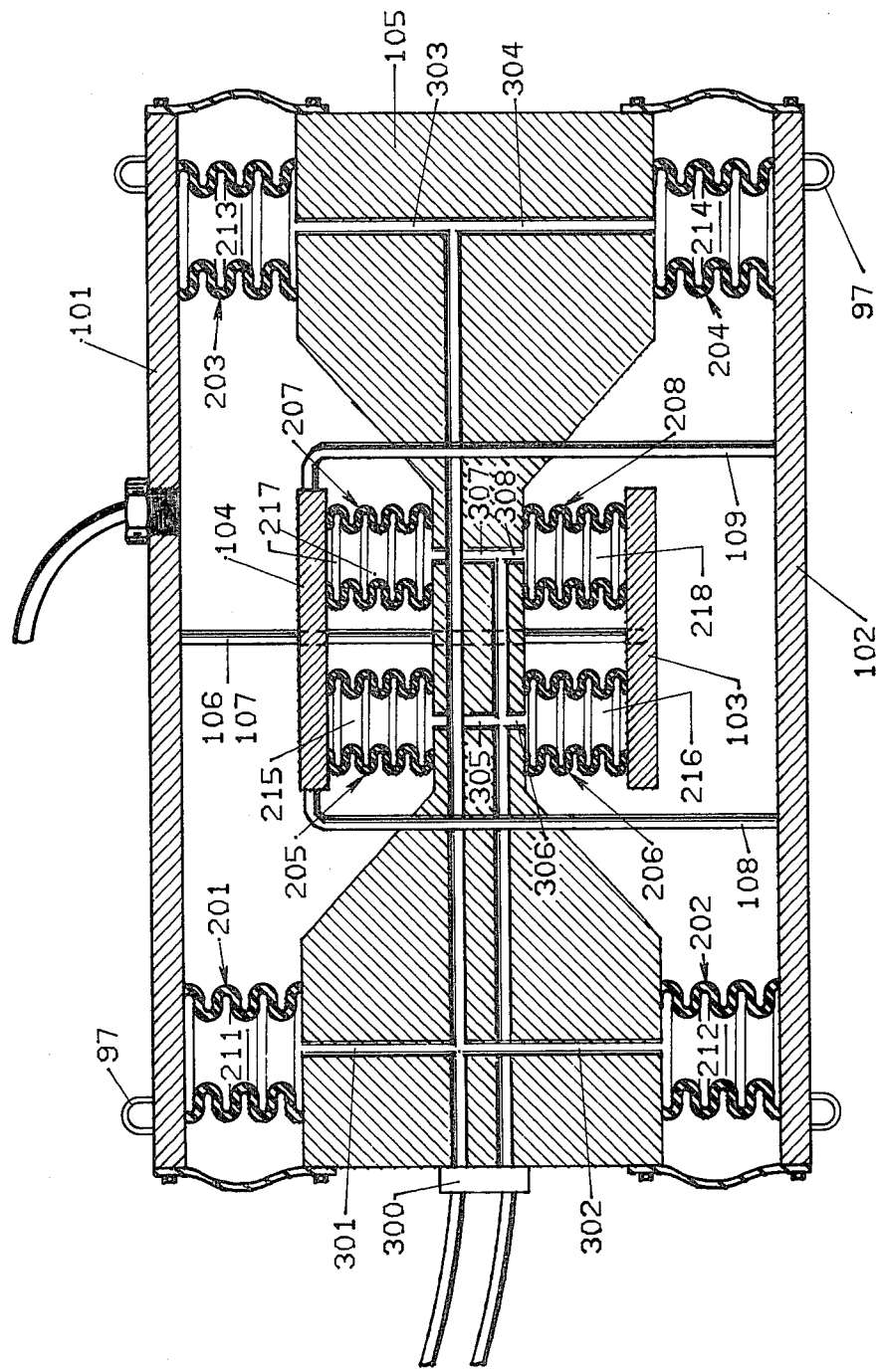
FIG. 4 is a view in horizontal cross-section of a seismic source embodying the second preferred configuration of the invention.

The second embodiment is shown in FIG. 4. A conduit plate 105 is added and is placed between the two transducer plates 101, 102 of the source (FIG. 4). The rods 106, 107 connecting closure plate 103 to plate 101 pass through holes in plate 105 preferably without touching it. Rods 108, 109 connecting closure plate 104 to plate 102 also pass through plate 105 preferably without touching it.

A portion of a first set of cylindrical bellows 201, 203, defining chambers 211, 213, are sealingly connected between transducer plate 101 and conduit plate 105. The remaining portion of the first set of bellows 202, 204, defining chambers 212, 214, are sealingly connected between transducer plate 102 and conduit plate 105. In a similar fashion, a portion of a second set of cylindrical bellows 205, 207, defining chambers 215, 217, are sealingly connected between closure plate 104 and conduit plate 105. The remaining portion of the second set of bellows 206, 208, defining chambers 216, 218, are sealingly connected between closure plate 103 and conduit plate 105.

Conduits 301, 302, 303, 304, 305, 306, 307, 308 leading to chambers 211, 212, 213, 214, 215, 216, 217, 218, respectively, allow hydraulic pressure from servovalve 300 to be applied within or withdrawn from the chambers. Servovalve 300 is connected to a hydraulic pressure power supply located on a support vessel in a manner similar to that in the first embodiment. Also in the same manner as described in the earlier embodiment, when pressure is applied alternately through servovalve 300 within one set of bellows 201, 202, 203, 204, and within the other set 205, 206, 207, 208, reciprocating movement of transducer plates 101, 102 is generated. Since the pressures exerted on either side of plate 105 are opposite and substantially equal through the sweep of the vibrator, there is no resultant force on it and plate 105 remains stationary. It may be desirable to maintain transducer plates 101, 102 substantially equidistant from conduit plate 105 duing the vibrational sweep. This can be done by using bellows of suitable dimensions. For example, bellows 201, 202, 203, 204, 205, 206, 207, 208 may be substantially similar to one another.

Addition of plate 105 allows convenient routing of hydraulic conduits leading to the bellows from the servovalve and attachment of servovalve 300.

The foregoing disclosure and description of the invention are illustrative and explanatory thereof, and various changes in sizes, shape and materials, as well as in the details of the illustrated construction may be made within the scope of the appended claims without departing from the spirit of the invention.

I claim:

1. An apparatus for imparting seismic energy into a body of water comprising:
   two transducer plates spaced apart from each other;
   a first bellows;
   a second bellows;
   means for connecting said first bellows between said two transducer plates so that expansion of said first bellows pushes said two transducer plates apart; and
   means for connecting said second bellows to said two transducer plates so that expansion of said second bellows pulls said two transducer plates towards each other;
   means for alternately applying pressure to said first and second bellows such that said two transducer plates reciprocate with respect to each other.

2. An apparatus for imparting seismic energy into a body of water comprising:
   a first transducer plate;
   a second transducer plate spaced apart from said first transducer plate;
   a first reaction member placed between said transducer plates and attached to said first transducer plate;
   a second reaction member placed between said transducer plates and attached to said second transducer plate in such a manner that said second reaction member lies between said first transducer plate and said reaction member;
   a first bellows sealingly connected between said two transducer plates;
   a second bellows sealingly connected between said two reaction members;
   means for alternately applying fluid pressure to said first and second bellows to generate reciprocating movement of said two transducer plates.

3. An apparatus for imparting seismic energy into a body of water comprising:
   a first transducer plate;
   a second transducer plate spaced apart from said first transducer plate;
   a first set of bellows, each bellows sealingly connected to each of said transducer plates so that expansion of bellows in said first set will push said two transducer plates apart;
   a first closure plate, disposed between said transducer plates and connected to said first transducer plate;
   a second closure plate disposed between said first transducer plate and said first closure plate, said second closure plate being connected to said second transducer plate;
   a second set of bellows, each bellows sealingly connected to each of said closure plates, so that as the bellows in said second set expand, said closure plates move apart, and said transducer plates move towards each other;
   means for alternately applying pressure to said first and second sets of bellows to generate reciprocating movement of said transducer plates.

4. The apparatus of claim 3, further comprising a means for flexibly sealing the space between said transducer plates.

5. The apparatus of claim 4, further including a means for counteracting the hydrostatic pressure of the water surrounding said transducer plates, so as to facilitate the functioning of the bellows.

6. The apparatus of claim 3 wherein each bellows in said sets of bellows comprises:
   a convoluted sheet of metal, in the general shape of a cylinder with open ends; and
   a mounting ring rigidly secured around each end of said cylindrical sheet, said mounting ring including means to provide sealing joinder to adjacent plate surfaces.

7. The apparatus of claim 3, further comprising;
   a fluid pressure supply means;
   a first conduit channeled through said first transducer plate, connected to said first set of bellows;
   a second conduit channeled through said second closure plate, connected to said second set of bellows; and
   a servovalve connected to said fluid pressure supply means and said first and second conduits, which can rapidly reverse the application of fluid pressures from said fluid pressure supply means between said first and second conduits.

8. A marine seismic energy source comprising:
   a first transducer plate having a rim and an air passage;
   a second transducer plate having a rim and spaced apart from said first transducer plate;
   a rubber cylinder which surrounds the space between said two transducer plates;
   means for clamping said rubber cylinder onto the rims of said two transducer plates so as to flexibly seal the space between said transducer plates;
   an air control apparatus that is connected to the air passage in said first transducer plate, so that the pressure within the space between said two transducer plates may be adjusted to facilitate the functioning of the bellows;
   a first set of bellows, each bellows sealingly connected to each of said transducer plates so that expansion of bellows in said first set will push said two transducer plates apart;
   a first closure plate, disposed between said transducer plates and connected to said first transducer plate;
   a second closure plate disposed between said first transducer plate and said first closure plate, said second closure plate being connected to said second transducer plate;
   a second set of bellows, each bellows sealingly connected to each of said closure plates, so that as the bellows in said second set expand, said closure plates move apart, and said transducer plates move towards each other;
   means for alternately applying pressure to said first and second sets of bellows to generate reciprocating movement of said transducer plates.

9. An apparatus for imparting seismic energy into a body of water comprising:
   a first transducer plate;
   a second transducer plate spaced apart from said frist transducer plate;
   a conduit plate disposed between and spaced apart from said transducer plates, said conduit plate having openings therein;
   a first set of bellows including at least two bellows, with each bellows in one portion of said first set sealingly connected to said first transducer plate and said conduit plate, and each bellows in the remaining portion sealingly connected to said second transducer plate and said conduit plate, so that expansion of the bellows in said first set will tend to push said transducer plates away from said conduit plate;

a first closure plate disposed between said second transducer plate and said conduit plate;

a plurality of rods that connect said first closure plate to said first transducer plate, said rods passing through openings in the conduit plate;

a second closure plate disposed between said first transducer plate and said conduit plate;

a plurality of rods that connect said second closure plate and said second transducer plate, said rods passing through openings in the conduit plate;

a second set of bellows including at least two bellows, with each bellows in one portion of said second set sealingly connected to said second closure plate and said conduit plate, and each bellows in the remaining portion seallingly connected to said first closure plate and said conduit plate, so that expansion of the bellows in said second set will tend to push said closure plates away from said conduit plate, thereby pulling said transducer plates towards said conduit plate;

means for alternately applying fluid pressure within said first set and second set of bellows so that the bellows in said first set and the bellows in said second set will expand alternately;

whereby said transducer plates will be reciprocated with respect to said conduit plate by the alternate application of fluid pressure within said first and second sets of bellows.

10. The apparatus of claim 9, wherein the bellows are of such dimensions that said first and second transducer plates remain substantially equidistant from the conduit plate while they are reciprocating about said conduit plate in opposite phase to each other.

11. The apparatus of claim 9, wherein said fluid pressure applying means comprises:

fluid pressure supply means;

servovalve means connected to said fluid pressure supply means; and first and second conduits channeled through the conduit plate, connecting respectively said first and second sets of bellows to said servovalve, so that the fluid pressure applied through said servovalve by said fluid pressure supply means alternates between said first and second sets of bellows.

12. A method of imparting seismic energy into a body of water by reciprocating two transducer plates, said method comprising:

alternately applying fluid pressure within a first and second bellows, said first bellows being connected between said transducer plates so that expansion of said first bellows pushes said transducer plates apart, and said second bellows being connected to said transducer plates so that expansion of said second bellows pulls said transducer plates towards each other.

* * * * *